United States Patent
Bartholomew et al.

(10) Patent No.: US 8,916,485 B2
(45) Date of Patent: Dec. 23, 2014

(54) ACRYLIC COMPOSITIONS ADHERING TO LOW SURFACE ENERGY SUBSTRATES

(75) Inventors: Eric L. Bartholomew, Mill Hall, PA (US); William L. Bottorf, Mill Hall, PA (US); Kyle R. Heimbach, Millmont, PA (US); Christopher L. Lester, Mill Hall, PA (US); Brandon S. Miller, Lock Haven, PA (US); Michael Zajaczkowski, Bellefonte, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/395,497

(22) PCT Filed: Sep. 24, 2010

(86) PCT No.: PCT/US2010/050158
§ 371 (c)(1),
(2), (4) Date: Mar. 12, 2012

(87) PCT Pub. No.: WO2011/038202
PCT Pub. Date: Mar. 31, 2011

(65) Prior Publication Data
US 2012/0171915 A1    Jul. 5, 2012

Related U.S. Application Data

(60) Provisional application No. 61/245,431, filed on Sep. 24, 2009.

(51) Int. Cl.
*C09J 7/02* (2006.01)
*C09J 7/04* (2006.01)

(52) U.S. Cl.
CPC ............... *C09J 7/0217* (2013.01); *C09J 7/0289* (2013.01); *C09J 7/041* (2013.01); *C09J 2203/334* (2013.01); *C09J 2400/263* (2013.01); *C09J 2433/00* (2013.01)
USPC ...................... 442/151; 428/315.5; 428/317.3

(58) Field of Classification Search
CPC .................... C09J 2203/334; C09J 2400/263; C09J 2433/00; C09J 7/0217; C09J 7/0289; C09J 7/041

USPC .......... 442/151; 524/558, 555, 548, 549, 561, 524/553; 428/315, 317, 355; 523/400
See application file for complete search history.

(56) References Cited

U.S. PATENT DOCUMENTS

| | | | |
|---|---|---|---|
| 4,181,752 A | 1/1980 | Martens et al. | |
| 4,303,485 A | 12/1981 | Levens | |
| 4,329,384 A | 5/1982 | Moon et al. | |
| 4,330,590 A | 5/1982 | Vesley et al. | |
| 4,569,977 A | 2/1986 | Werber | |
| 5,602,221 A | 2/1997 | Bennett et al. | |
| 5,708,109 A | 1/1998 | Bennett et al. | |
| 2003/0091815 A1 | 5/2003 | Buccellato et al. | |
| 2004/0241215 A1* | 12/2004 | Lipman | 424/445 |
| 2005/0142357 A1* | 6/2005 | Zajaczkowski et al. | 428/343 |
| 2005/0170164 A1 | 8/2005 | Christ et al. | |
| 2010/0120931 A1 | 5/2010 | Lester et al. | |

OTHER PUBLICATIONS

Handbook of Pressure Sensitive Adhesive Technology, Von Nostrand Reinhold, Co, Chap. 20, pp. 527-584 (1989).

* cited by examiner

*Primary Examiner* — Peter Y Choi
*Assistant Examiner* — Vincent A Tatesure
(74) *Attorney, Agent, or Firm* — Avery Dennison Corporation

(57) ABSTRACT

In general, the invention features a pressure sensitive adhesive that comprises the reaction product of:
(a) from about 25 to about 95 parts by weight of at least one acrylic acid ester of a monohydric alcohol whose homopolymer has a $T_g$ less than 0° C.,
(b) from 0 to about 75 parts by weight of at least one non-polar ethylenically unsaturated monomer whose homopolymer has a solubility parameter of no greater than 10.50 and a $T_g$ greater than 15° C.; and
(c) from about 5 to about 35 parts by weight of at least one polar ethylenically unsaturated monomer whose homopolymer has a solubility parameter of greater than 10.50 and a $T_g$ greater than 15° C.

The pressure sensitive adhesives adhere to substrates having a low surface energy and/or high surface energy.

18 Claims, No Drawings

ACRYLIC COMPOSITIONS ADHERING TO LOW SURFACE ENERGY SUBSTRATES

CROSS-REFERENCE TO RELATED APPLICATION

The present application is a 371 of International Application No. PCT/US2010/050158, which was published in English on Mar. 31, 2011, which claims priority to U.S. Provisional Application No. 61/245,431 filed Sep. 24, 2009, which is incorporated herein by reference in its entirety.

FIELD OF THE INVENTION

This invention relates to pressure sensitive adhesives. In particular, the invention relates to pressure sensitive adhesives which adhere to substrates having a low surface energy and/or high surface energy.

DESCRIPTION OF THE BACKGROUND ART

Acrylate pressure sensitive adhesives are well known in the art. Many of these adhesives are copolymers of an alkyl ester of acrylic acid and a minor portion of a polar co-monomer. Due to the presence of the polar co-monomer these adhesives generally do not adhere well to low energy and oily surfaces (e.g., surfaces having a critical surface tension of wetting of no greater than about 35 dynes/cm).

SUMMARY OF THE INVENTION

In general, the invention features a pressure sensitive adhesive that comprises the reaction product of:
 (a) from about 25 to about 95 parts by weight of at least one acrylic acid ester of a monohydric alcohol whose homopolymer has a $T_g$ less than 0° C.,
 (b) from 0 to about 75 parts by weight of at least one non-polar ethylenically unsaturated monomer whose homopolymer has a solubility parameter of no greater than 10.50 and a $T_g$ greater than 15° C.; and
 (c) from about 5 to about 35 parts by weight of at least one polar ethylenically unsaturated monomer whose homopolymer has a solubility parameter of greater than 10.50 and a $T_g$ greater than 15° C.

In a further embodiment, the pressure sensitive adhesive comprises the reaction product of:
 (a) from about 25 to about 95 parts by weight of at least one acrylic acid ester of a monohydric alcohol whose homopolymer has a $T_g$ less than 0° C.,
 (b) from 0 to about 75 parts by weight of at least one non-polar ethylenically unsaturated monomer whose homopolymer has a solubility parameter of no greater than 10.50 and a $T_g$ greater than 15° C.; and
 (c) from about 5 to about 35 parts by weight of at least one polar ethylenically unsaturated monomer whose homopolymer has a solubility parameter of from greater than 10.50 to about 13.5 and a $T_g$ greater than 15° C.

In another embodiment, the pressure sensitive adhesive comprises the reaction product of:
 (a) from about 25 to about 95 parts by weight of at least one acrylic acid ester of a monohydric alcohol whose homopolymer has a $T_g$ less than 0° C.,
 (b) from 0 to about 75 parts by weight of at least one non-polar ethylenically unsaturated monomer whose homopolymer has a solubility parameter of no greater than 10.50 and a $T_g$ greater than 15° C.; and
 (c) from about 5 to about 35 parts by weight of at least one polar ethylenically unsaturated monomer with the generic structure of Formula I

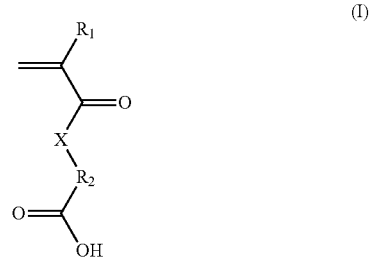

wherein in the structure of Formula I,
$R_1$=H, or $C_1$-$C_4$ alkyl
X=N or O
$R_2$=Phenyl or $C_3$-$C_6$ cycloakyl.

In a further embodiment, the pressure sensitive adhesive comprises the reaction product of (a) from about 25 to about 95 parts by weight of at least one acrylic acid ester of a monohydric alcohol whose homopolymer has a $T_g$ less than 0° C., (b) from 0 to about 75 parts by weight of at least one additional ethylenically unsaturated monomer, (c) from about 5 to about 35 parts by weight of at least one polar ethylenically unsaturated monomer with the generic structure of Formula I:

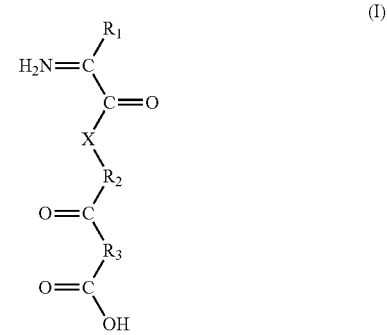

where in the structure of Formula I
$R_1$=H or $CH_3$
X=O or N
$R_2$=Formula II

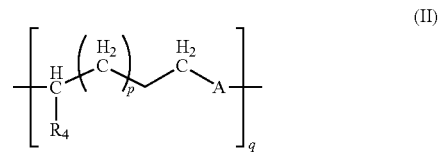

wherein $R_4$ is a member selected from the group consisting of hydrogen, methyl, ethyl, chloromethyl, methylol, phenyl, methoxyphenyl, methoxybutyl, and methoxyallyl. P is an integer of from about 0 to 3, q is an integer of from 1 to 3; $R_3$ is an unsaturated divalent alkyl or substituted alkyl group of from 2-4 carbon atoms or a saturated or unsaturated divalent carbocyclic aliphatic ring of from 4-9 carbon atoms, and preferably 5-6 carbon atoms; and A is a member selected from the group consisting of O, NH, or $NR_1$ where $R_1$ is previously defined.

The solubility parameter referred to herein is calculated according to the technique described in Fedors, Polym. Eng. and Sci., 14:147 (1974). A monomer whose homopolymer has a solubility parameter of greater than 10.50 when measured according to the Fedors technique is referred to herein as a polar monomer, whereas a monomer whose homopolymer has a solubility parameter of 10.50 or less when measured according to the Fedors technique is referred to herein as a non-polar monomer.

The invention provides pressure sensitive adhesives which, by virtue of incorporating a non-polar ethylenically unsaturated monomer (component (b)) along with a polar ethylenically unsaturated monomer in amounts of from about 5-35 parts (component (c)), exhibit good adhesion to low energy (e.g., plastics such as polyolefin plastics) surfaces. The adhesives exhibit good adhesion to high energy surfaces such as stainless steel as well.

The adhesives are less toxic than other conventional adhesives containing, for example, polar heteroatom acrylates. The adhesives further exhibit good shear properties both at low and high temperatures, particularly when a small amount of polar co-monomer is included.

The adhesives offer the further advantage of reduced sensitivity to moisture and reduced tendency to corrode metals such as copper.

Other features and advantages of the invention will be apparent from the following description of the preferred embodiments thereof, and from the claims.

DESCRIPTION OF THE PREFERRED EMBODIMENTS

Fundamentally, PSA's require a delicate balance of viscous and elastic properties which result in a four-fold balance of adhesion, cohesive, stretchiness and elasticity. In essence, PSA products have sufficient cohesiveness and elasticity so that, despite their aggressive tackiness, they can be handled with fingers and be removed from smooth surfaces without leaving residue. General trade usage does not sanction the extension of the term PSA to embrace tapes and adhesives merely because they are "sticky" or because they adhere to a particular type of surface.

The pressure sensitive adhesives of this invention display good adhesion to both low energy surfaces such as polypropylene and high energy surfaces such as stainless steel. In both cases, the 90° peel strength after a 72 hour dwell is at least 2 lbs/0.5 in., preferably at least 2.5 lbs/0.5 in., and more preferably at least 3 lbs/0.5 in. measured according to Test Procedure B, infra. The adhesives also display good cohesive strength properties as measured by the shear strength. Preferably, the shear strength at both room temperature and 70° C. is greater than 50 minutes, more preferably greater than 1,000 minutes, and even more preferably greater than 10,000 minutes measured according to Test Procedure C, infra. These properties are achieved by controlling the monomeric composition to achieve the appropriate polarity (as measured by the solubility parameter of the homopolymers of the individual monomers determined according to the Fedors technique) and rheological properties ($T_g$ as measured by the 1 radian/second tan delta maximum temperature of the adhesive polymer). A list of several common monomers and their respective Fedors' solubility parameters is shown in Table 1. Table 1 is subdivided into four sections: low $T_g$ acrylate monomers, high $T_g$ acrylate monomers, high $T_g$ methacrylate monomers, and vinyl monomers.

TABLE 1

FEDORS' SOLUBILITY PARAMETERS

| Repeat Unit | Solubility Parameter Repeat Unit $(cal/cm^3)^{0.5}$ |
|---|---|
| Octadecyl acrylate (ODA) | 8.99 |
| Lauryl acrylate (LA) | 9.15 |
| Iso-octyl acrylate (IOA) | 9.22 |
| 2-ethylhexyl acrylate (2-EHA) | 9.22 |
| Butyl acrylate (BA) | 9.77 |
| Propyl acrylate (PA) | 9.95 |
| Ethyl acrylate (EA) | 10.20 |
| 3,3,5 trimethylcyclohexyl acrylate (TMCA) | 9.35 |
| Iso-bornyl acrylate (IBA) | 9.71 |
| Cyclohexyl acrylate (CHA) | 10.16 |
| N-octyl acrylamide (NOA) | 10.33 |
| Tetrahydrofurfuryl acrylate (THFA) | 10.53 |
| Methyl acrylate (MA) | 10.56 |
| Glycidyl acrylate (GA) | 11.32 |
| 2-Phenoxyethylacrylate (2-PhEA) | 11.79 |
| N-vinylcaprolactam (NVC) | 12.10 |
| N,N,-Dimethylacrylamide (DMA) | 12.32 |
| N-vinyl-2-pyrrolidone (NVP) | 13.38 |
| Acrylic Acid (AA) | 14.04 |
| Methylmethacrylate (MMA) | 9.93 |
| Ethylmethacrylate (EMA) | 9.72 |
| Propylmethacrylate (PMA) | 9.57 |
| Vinyl Acetate | 10.56 |
| Styrene | 11.87 |

The rheological character of the adhesive polymer can be partially but usefully described by the $T_g$ as measured by the 1 radian/second tan delta maximum temperature. It is preferable for the $T_g$ as measured by the 1 radian/second tan delta maximum of the polymer to have a value between −45° C. and 15° C., more preferably between −25° C. and 0° C., and even more preferably between −20° C. and −5° C.

The adhesives according to the invention having the requisite polarity and rheological properties contain from about 25 to about 95 parts (more preferably from about 40 to about 85 parts) of an acrylic acid ester whose homopolymer has a $T_g$ less than 0° C. (more preferably less than −20° C.), from 0 to about 75 parts (more preferably from about 15 to about 60 parts) of a non-polar ethylenically unsaturated monomer whose homopolymer has a $T_g$ greater than 15° C., and from about 5 to about 35 parts of a polar ethylenically unsaturated monomer whose homopolymer has a $T_g$ greater than 15° C.

The acrylic acid ester is a monofunctional acrylic ester of a monohydric alcohol having from about 4 to about 18 carbon atoms in the alcohol moiety whose homopolymer has a $T_g$ less than 0° C. Included in this class of acrylic acid esters are isooctyl acrylate, 2-ethylhexyl acrylate, isononyl acrylate, isodecyl acrylate, decyl acrylate, lauryl acrylate, hexyl acrylate, butyl acrylate, and octadecyl acrylate, 2-propyl heptyl acrylate or combinations thereof. In the case of octadecyl acrylate, the amount is chosen such that side chain crystallization does not occur at room temperature.

The non-polar ethylenically-unsaturated monomer is a monomer whose homopolymer has a solubility parameter as measured by the Fedors method of not greater than 10.50 and a $T_g$ greater than 15° C. The non-polar nature of this monomer improves the low energy surface adhesion of the adhesive. It also improves the structural properties of the adhesive (e.g., cohesive strength) relative to a homopolymer of the acrylic acid ester described above. Examples of suitable non-polar monomers include 3,3,5 trimethylcyclohexyl acrylate, cyclohexyl acrylate, isobornyl acrylate, N-octyl acrylamide, t-butyl acrylate, methyl methacrylate, ethyl methacrylate, and propyl methacrylate or combinations thereof.

The adhesive further contains a polar ethylenically unsaturated monomer whose homopolymer has a solubility parameter as measured by the Fedors method of greater than 10.50 and a $T_g$ greater than 15° C. to improve structural properties (e.g., cohesive strength). Examples of suitable polar monomers include acrylic acid, itaconic acid, certain substituted acrylamides such as N,N dimethylacrylamide, N-vinyl-2-pyrrolidone, N-vinyl caprolactam, acrylonitrile, tetrahydrofurfuryl acrylate, glycidyl acrylate, 2-phenoxyethylacrylate, and benzylacrylate, or combinations thereof.

The monomer mixture can be polymerized by various techniques, with photoinitiated bulk polymerization being preferred. An initiator is preferably added to aid in polymerization of the monomers. The type of initiator used depends on the polymerization process. Photoinitiators which are useful for polymerizing the acrylate monomers include benzoin ethers such as benzoin methyl ether or benzoin isopropyl ether, substituted benzoin ethers such as 2-methyl-2-hydroxylpropiophenone, aromatic sulfonyl chlorides such as 2-naphthalenesulfonyl chloride, and photoactive oxides such as 1-phenyl-1,2-propanedione-2-(o-ethoxycarbonyl)oxime. An example of a commercially available photoinitiator is Irgacure™ 651 available from Ciba-Geigy Corporation, having the formula 2,2-dimethoxy-1,2-diphenylethane-1-one). Generally, the photoinitiator is present in an amount of about 0.005 to 1 weight percent based on the weight of the monomers. Examples of suitable thermal initiators include AIBN and peroxides.

The mixture of the polymerizable monomers may also contain a crosslinking agent, or a combination of crosslinking agents, to increase the shear strength of the adhesive. The following is a listing of the types of crosslinkers useable in the present invention:

TABLE 2

| Functional Group of Acrylic or Oligomer | Crosslinker |
| --- | --- |
| Silane Hydroxyl | Self-reactive |
| | Isocyanate, Melamine Formaldehyde, Anhydride, Epoxy, Titanium esters and Chelates |
| Carboxylic acid, phosphoric acid | Aziridines, Isocynate, Melamine Formaldehyde, Anhydride, Epoxy, Carboiimides, Metal Chelates, Titanium esters and Ocazolines |
| Isocyanate Vinyl (Meth)acrylate | Self-reactive, Carboxylic acid, Amine, Hydroxyl Addition reaction with Silicone hydride |
| | Amine, Mercaptan, Self-reactive with radical catalyst (UV, Thermal), Acetoacetate |
| Epoxy Amine | Amine, Carboxylic acid, Phosphoric acid, Hydroxyl, Mercaptan, Isocyanate, Melamine formaldehyde, anhydride, epoxy, acetoacetate |
| Mercapto Acetoacetate | Isocyanate, Melamine formaldehyde, Anhydride, Epoxy Acrylate, Amine |

In a more particular embodiment, useful crosslinking agents include substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the specifically chromophore-substituted halo-s-triazines disclosed in U.S. Pat. Nos. 4,329,384 and 4,330,590 (Vesley) incorporated herein by reference. Other useful crosslinking agents include multifunctional alkyl acrylate monomers such as trimetholpropane triacrylate, pentaerythritol tetra-acrylate, 1,2 ethylene glycol diacrylate, 1,4 butanediol diacrylate, 1,6 hexanediol diacrylate, and 1,12 dodecanol diacrylate. Various other crosslinking agents such as those described in U.S. Publ. No. 2010/0120931A1, incorporated herein by reference in its entirety, with different molecular weights between (meth)acrylate functionality would also be useful. Generally, the crosslinker is present in an amount of about 0.005 to 1 weight percent based on the combined weight of the monomers.

The pressure sensitive adhesives may be used in adhesive articles such as labels, tapes, sheets, decorative appliqués, and the like, Suitable substrates serving as adhesive carriers or facestocks to which the adhesive may be applied include non-woven material, such as, for example, paper, plastic, metal or foam; woven material, such as, for example, woven cotton or woven synthetic polymers. Non-limiting examples synthetic polymers include polyethylene, polypropylene, polyvinyl chloride, polyester and polyamide. The adhesive may be applied to the substrate by any conventional method, including extrusion, spraying, roll coating, curtain coating, etc.

In addition to pressure sensitive adhesives, the composition may be used to form foam articles such as foam carriers and tapes, and foam adhesives. In one embodiment, a foam article is formed from a blend comprising (a) the acrylate polymer (b) the liquid oligomer and (d) expandable microspheres or a blowing agent; wherein at least one of (a) and (b) is crosslinked in the presence of the other.

Where a foam-like pressure sensitive adhesive tape is desired, a monomer blend containing microspheres may be used. Suitable microspheres are commercially available from Kema Nord Plastics under the trade name "Expancel" and from Matsumoto Yushi Seiyaku under the trade name "Micropearl". When expanded the microspheres have a specific density of approximately 0.02-0.036 g/cc. It is possible to include the unexpanded microspheres in the pressure sensitive adhesive composition and subsequently heat them to cause expansion when they are appropriately processed, but it is generally preferred to mix the expanded microspheres into the adhesive. This process makes it easier to ensure that the hollow microspheres in the final adhesive are substantially surrounded by at least a thin layer of adhesive.

Polymeric microspheres having an average diameter of 10 to 200 micrometers may be blended into the polymerizable composition in amounts from about 15% to about 75% by volume prior to coating. Also useful are glass microspheres having an average diameter of from 5 to 200 micrometers, preferably from about 20 to 80 micrometers. Such microspheres may comprise 5% to 65% by volume of the pressure sensitive adhesive. Both polymeric and glass microspheres are known in the art. The pressure sensitive adhesive layer of the tape should be at least 3 times as thick as the diameter of the microspheres, preferably at least 7 times.

Other tape constructions in which the pressure sensitive adhesives according to the invention are useful include mechanical fasteners such as Dual-Lock™ brand fastener (Minnesota Mining and Manufacturing Co., St. Paul, Minn.) and Scotchmate™ brand fastener (Minnesota Mining and Manufacturing Co., St. Paul, Minn.). The pressure sensitive adhesives are also useful in vibration damping applications.

Other materials which can be blended with the polymerizable monomers prior to coating include plasticizers, tackifiers, coloring agents, reinforcing agents, fire retardants, foaming agents, thermally conductive agents, electrically conductive agents, post-curing agents, and post-curing agent curatives and their accelerators, and the like. Examples of these types of materials can be found in U.S. Publ. No. 2010/0120931A1, the disclosure of which is incorporated herein by reference in its entirety.

The tackifiers, which are useful with the invertive adhesive, are substantially compatible with the acrylic polymer. The tackifier is substantially compatible with the acrylic polymer. As used herein, the term "substantially compatible" means that when the tackifier and the acrylic polymer are combined, the resulting combination is substantially transparent in dry film form, as opposed to opaque, to normal vision. A wide variety of tackifiers can be used to enhance the tack and peel of the adhesive and can be used singularly or in combination. These include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

There may also be employed terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez 1304, manufactured by Exxon Chemical Co., and aromatic hydrocarbon resins based on $C_9$, $C_5$, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Eastman Chemical Company, can be used. Various terpene phenolic resins of the type SP 560 and SP 553, manufactured and sold by Schenectady Chemical Inc., Nirez 1100, manufactured and sold by Reichold Chemical Inc., and Piccolyte S-100, manufactured and sold by Hercules Corporation, are particularly useful tackifiers for the present invention. Various mixed aliphatic and aromatic resins, such as Hercotex AD 1100, manufactured and sold by Hercules Corporation, can be used.

The particular tackifying resin and/or amount selected for a given formulation may depend upon the type of acrylic polymer being tackified. Many resins which are known in the prior art as being useful for tackifying acrylic based pressure sensitive adhesives can be effectively used in the practice of the present invention, although the scope of the invention is not limited to only such resins. Resins described in Satas, Handbook of Pressure Sensitive Adhesive Technology, Von Nostrand Reinhold, Co, Chap. 20, pages 527-584 (1989) (incorporated by reference herein) could be used.

The amount of tackifier used in the present invention is dependent upon the acrylate/oligomer blend and tackifier used. Typically, pressure-sensitive adhesive compositions prepared in accordance with the present invention will comprise from 5 to about 60% by weight total of one or more tackifiers.

The pressure sensitive adhesives according to the invention are preferably prepared by photoinitiated bulk polymerization according to the technique described in Martens et al., U.S. Pat. No. 4,181,752, hereby incorporated by reference. The polymerizable monomers and a photoinitiator are mixed together in the absence of solvent and partially polymerized to a viscosity in the range of from about 500 cps to about 50,000 cps to achieve a coatable syrup. Alternatively, the monomers may be mixed with a thixotropic agent such as fumed hydrophilic silica to achieve a coatable thickness. The crosslinking agent and any other ingredients are then added to the prepolymerized syrup. Alternatively, these ingredients (with the exception of the crosslinking agent) can be added directly to the monomer mixture prior to pre-polymerization.

The resulting composition is coated onto a substrate (which may be transparent to ultraviolet radiation) and polymerized in an inert (i.e., oxygen free) atmosphere, e.g., a nitrogen atmosphere by exposure to ultraviolet radiation. Examples of suitable substrates include release liners (e.g., silicone release liners) and tape backings (which may be primed or unprimed paper or plastic). A sufficiently inert atmosphere can also be achieved by covering a layer of the polymerizable coating with a plastic film which is substantially transparent to ultraviolet radiation, and irradiating through that film in air as described in the aforementioned Martens et al. patent using ultraviolet lamps. Alternatively, instead of covering the polymerizable coating, an oxidizable tin compound may be added to the polymerizable syrup to increase the tolerance of the syrup to oxygen as described in U.S. Pat. No. 4,303,485 (Levens). The ultraviolet light source preferably has 90% of the emissions between 280 and 400 nm (more preferably between 300 and 400 nm), with a maximum at 351 nm.

Where multi-layer tape constructions are desirable, one method of construction is multi-layer coating using conventional techniques. For example, the coatings may be applied concurrently (e.g., through a die coater), after which the entire multi-layer structure is cured all at once. The coatings may also be applied sequentially whereby each individual layer is partially or completely cured prior to application of the next layer.

Test Procedures

Test procedures used to evaluate pressure sensitive adhesives include the following:

Monomer Conversion Test (Test Procedure A)

The monomer conversion is determined gravimetrically. A sample of the adhesive is weighed after it is coated and subsequently dried at 120° C. for 3 hours and then re-weighed. The percent volatiles is taken to be indicative of the monomer conversion.

90° Peel Adhesion Test (Test Procedure B)

One-half inch wide strips of the adhesive sample are carefully cut and placed onto a substrate of interest. The adhesive thickness was 5 mils. A 5 mil anodized aluminum backing (0.625 in, wide) is then laminated to the adhesive which is approximately 5 inches long. Test substrates of interest include low energy surfaces such as polypropylene (2"×5"× 3/16 natural polypropylene panels from Precision Punch and Plastic, Minneapolis, Minn., with a mask on both sides that is removed prior to cleaning and testing) and polycarbonate (Lexan™ from General Electric Co.), and high energy surfaces such as stainless steel (304-2BA 28 gauge stainless steel with a surface roughness of 2.0.±1.0 microinches). A free end of the backing to which the adhesive is laminated extends beyond the test substrate so that it can be clamped to a load cell to determine peel strength.

The sample is rolled back and forth twice with a 2 kg hard rubber roller to ensure contact between the adhesive and the test substrate. The adhesive is then removed after a given dwell time (usually 72 hours unless otherwise noted) at 12"/minute in a 90° C. peel mode.

The stainless steel substrates are washed once with acetone and 3 times with a 50/50 isopropanol/water mixture prior to testing. The plastic substrates are washed 3 times with heptane prior to testing. The results are typically reported in lbs/0.5 in. width as the average of 2 tests. All tests are conducted at room temperature.

Shear Test (Test Procedure C)

A 0.5 inch strip of tape is adhered to a piece of stainless steel (304-2BA 28 gauge stainless steel with a surface roughness of 2.0±1.0 microinches) which has been cleaned once with acetone and 3 times with 50/50 isopropanol/water such that a one-half square inch overlap is accomplished. A piece of 5 mil anodized aluminum (0.625 in. wide) is then laminated to the entire area of the pressure sensitive adhesive, leaving an additional area to which a load could be applied. The adhesive thickness is 5 mils. The sample is then rolled back and forth twice with a 15 pound roller and allowed to dwell for four hours. The 70° C. samples are allowed to dwell for an additional 10 minutes. After dwelling the sample is tested at either room temperature or 70° C. At room temperature a 1 kg load is applied to the adhesive and the time before the load falls is recorded. At 70° C. a 500 g load is applied to the adhesive and the time before the load falls is recorded. The results are typically reported as the average of 2 tests.

Obviously, many modifications and variations of the invention as hereinbefore set forth may be made without departing from the spirit and scope thereof, and therefore, only such limitations should be imposed as are indicated in the appended claims.

What is claimed is:

1. A pressure sensitive adhesive comprising the reaction product of:
   (a) from about 25 to about 95 parts by weight of at least one acrylic acid ester of a monohydric alcohol whose homopolymer has a $T_g$ less than 0° C.,
   (b) from 0 to about 75 parts by weight of at least one additional ethylenically unsaturated monomer
   (c) about 35 parts by weight of at least one polar ethylenically unsaturated monomer with the generic structure of Formula I

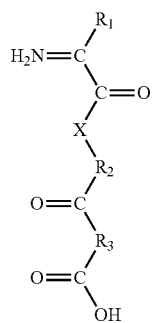

(I)

where in the structure of Formula I
$R_1$=H or $CH_3$
X=O or N
$R_2$=Formula II

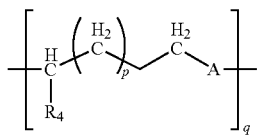

(II)

wherein $R_4$ is a member selected from the group consisting of hydrogen, methyl, ethyl, chloromethyl, methylol, phenyl, methoxyphenyl, methoxybutyl, and methoxyallyl; P is an integer of from about 0 to 3, q is an integer of from 1 to 3; $R_3$ is an unsaturated divalent alkyl or substituted alkyl group of from 2-4 carbon atoms or a saturated or unsaturated divalent carbocyclic aliphatic ring of from 4-9 carbon atoms, and preferably 5-6 carbon atoms; and A is a member selected from the group consisting of O, NH, or $NR_1$ where $R_1$ is previously defined.

2. The pressure sensitive adhesive of claim 1, wherein component (b) is at least one non-polar ethylenically unsaturated monomer whose homopolymer has a solubility parameter of no greater than 10.50 and a $T_g$ greater than 15° C.

3. A pressure sensitive adhesive according to claim 1 wherein component (a) is a monofunctional acrylic ester of a monodyric alcohol having from about 4 to about 18 carbon atoms on the alcohol moiety.

4. A pressure sensitive adhesive according to claim 3 wherein component (a) is selected from isooctyl acrylate, 2-ethylhexyl acrylate, isononyl acrylate, isodecyl acrylate, decyl acrylate, lauryl acrylate, hexyl acrylate, butyl acrylate, and octadecyl acrylate, 2-propyl heptly acrylate or combinations thereof.

5. A pressure sensitive adhesive according to claim 2 wherein component (b) is selected from include 3,3,5 trimethylcyclohexyl acrylate, cyclohexyl acrylate, isobornyl acrylate, N-octyl acrylamide, t-butyl acrylate, methyl methacrylate, ethyl methacrylate, and propyl methacrylate or combinations thereof.

6. A pressure sensitive adhesive according to claim 1 further comprising at least one cross-linking agent.

7. A pressure sensitive adhesive according to claim 6 wherein the cross-linking agent is selected from triazines and multi-functional alkyl acrylate monomers.

8. A pressure sensitive adhesive according to claim 1 further comprising at least one tackifier.

9. A pressure sensitive adhesive of claim 8 wherein the tackifier is selected from hydrocarbon resins, wood resins, rosins, rosin derivatives, and combinations of two or more thereof.

10. A label comprising a facestock and a PSA of claim 1.

11. A label according to claim 10 which adheres to surfaces having a critical surface tension of wetting of no greater than about 35 dynes/cm.

12. A label according to claim 10 which adheres to polyolefin surfaces, and metal surfaces.

13. A label according to claim 10 which adheres to polypropylene and stainless steel.

14. A tape comprising a base material and a PSA of claim 1.

15. A tape according to claim 14 wherein the base material is a foam.

16. A tape according to claim 15 wherein the base material is a microporous foam.

17. A tape according to claim 14 wherein the base material is a non-woven material.

18. A pressure sensitive adhesive according to claim 1 wherein X=N.

* * * * *